UNITED STATES PATENT OFFICE.

ARTHUR D. LITTLE, OF BROOKLINE, MASSACHUSETTS, ASSIGNOR TO CELLULOSE PRODUCTS COMPANY, OF WILMINGTON, DELAWARE, A CORPORATION OF DELAWARE.

WATER AND GREASE PROOF PAPER.

SPECIFICATION forming part of Letters Patent No. 691,951, dated January 28, 1902.

Application filed May 27, 1901. Serial No. 62,141. (No specimens.)

*To all whom it may concern:*

Be it known that I, ARTHUR D. LITTLE, of Brookline, in the county of Norfolk and State of Massachusetts, have invented an Improvement in Water and Grease Proof Paper, of which the following description is a specification.

This invention has for its object the production of a new and improved paper which is practically both water and grease proof, such paper being especially adapted for wrapping food products and other articles which may be greasy in themselves and liable to be injured by exposure to moisture.

The invention consists, essentially, in facing one side of any sort of paper, preferably unsized, with recovered cellulose by depositing thereon a continuous film of viscose solution and decomposing the viscose, which results in the recovery of the cellulose, and thereafter filling the other side with a waterproofing material, as paraffin.

In carrying out my invention I lightly brush or coat one side of the paper with a viscose solution, which may be prepared after the general plan set forth in United States Patent No. 520,770, using for this purpose an ordinary coating-machine, which is preferably supplied with vegetable-fiber brushes, or pass the paper under a doctor before which the viscose solution, of such strength as will not readily penetrate the paper, is held. The paper thus coated is dried in any suitable way and the viscose upon it decomposed, and both of these results may be obtained by passing treated paper upon and over drying cans or cylinders. It is desirable to dry the paper rather slowly at first in order to avoid the formation of bubbles in the film of viscose which is deposited or laid therein. As soon as the viscose coating has dried the temperature may be raised to 212° Fahrenheit or thereabouts to complete the decomposition of the viscose, resulting in the production of the recovered cellulose. Various methods for decomposing the viscose are described in United States Patent No. 604,206, which may be adopted. The decomposition is completed and the cellulose fixed when bits of paper dipped in water yield only inorganic salts. The treated paper is now preferably washed in water in the continuous way after the manner familiar in the treatment of parchment-paper, and it is then again dried by the passage over drying-cylinders, after which it is ready for the final treatment for the purposes of rendering it waterproof. The other side of the paper, not faced or covered with viscose, is impregnated with paraffin or other suitable waterproofing material by brushing or otherwise applying melted paraffin or other material or a solution containing paraffin or other waterproofing material to that side of the paper and removing the excess of material by squeezing-rolls, doctors, or in any other suitable manner.

I claim—

As a new article of manufacture, paper filled on one side with waterproofing material, and faced on the other side with recovered cellulose, substantially as described.

In testimony whereof I have signed my name to this specification in the presence of two subscribing witnesses.

ARTHUR D. LITTLE.

Witnesses:
B. J. NOYES,
JOHN W. DECROW.